R. H. WHITE.
TRACK BELT FOR TRACK LAYING TRACTORS.
APPLICATION FILED FEB. 11, 1918.
1,314,722.
Patented Sept. 2, 1919.
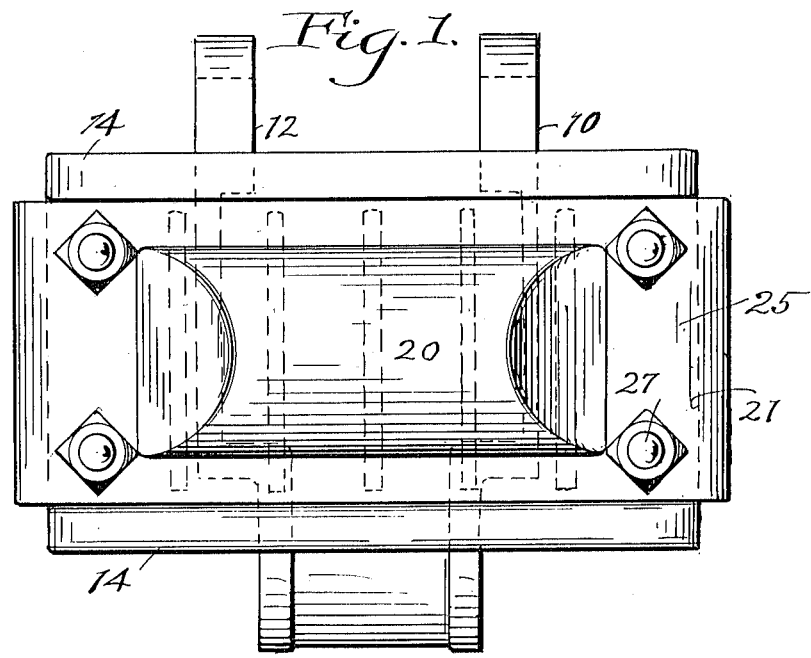
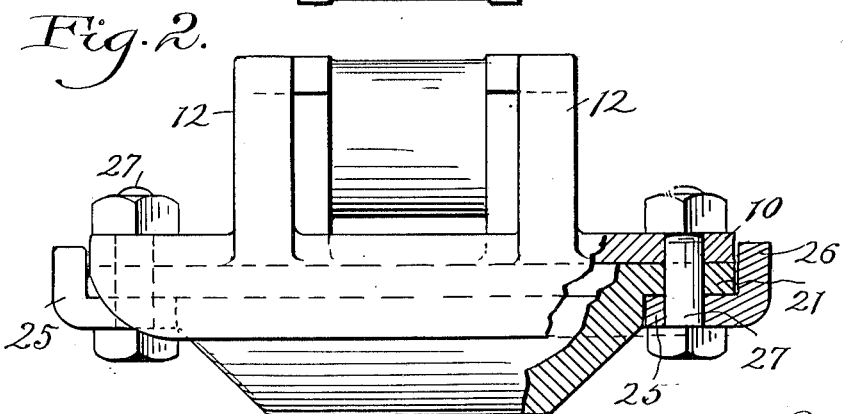
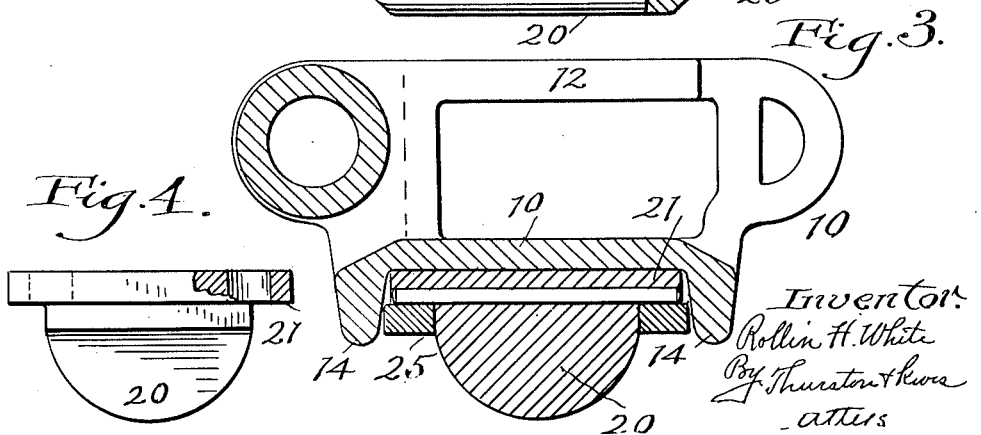
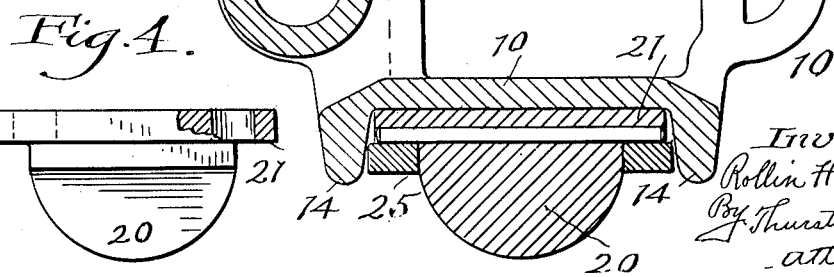

UNITED STATES PATENT OFFICE.

ROLLIN H. WHITE, OF CLEVELAND HEIGHTS, OHIO, ASSIGNOR TO THE CLEVELAND TRACTOR COMPANY, OF CLEVELAND, OHIO, A CORPORATION OF OHIO.

TRACK-BELT FOR TRACK-LAYING TRACTORS.

1,314,722.    Specification of Letters Patent.    Patented Sept. 2, 1919.

Application filed February 11, 1918. Serial No. 216,550.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Track-Belts for Track-Laying Tractors, of which the following is a full, clear, and exact description.

Track laying tractors are sometimes required to travel through soft dirt, sand and mud, and sometimes over hard smooth road surfaces. For the first named use it is desirable that the shoes of the track belt links be provided with outwardly projecting transverse grouser ribs which will penetrate the soft ground over which the tractor is going, and render the tractive effort of the machine more efficient. It is evident, however, that if the machine is to travel on a smooth hard surface these grouser ribs are worse than useless because of the fact that they may injure the road surface.

The object of this invention is to render a track laying tractor easily convertible so as to be best suited to either of these different circumstances of use.

The invention has to do wholly with the track belt, and particularly to the several links thereof, and involves the construction of said links with shoes having transversely extended outwardly projecting ribs which serve under certain conditions as grousers and under other conditions as abutments for an applied rubber tread block and the clamping plate therefor; and in removably securing to the outer face of each shoe between and in contact with said ribs a tread block of special construction and clamping plate therefor, so contrived that both longitudinal and transverse movement of said tread block and clamping plate relative to the shoe shall be practically impossible.

The invention consists in the construction and combination of parts shown in the drawing, hereinafter described and definitely pointed out in the appended claims.

In the drawings, Figure 1 is a plan view of the outside of one of many similar links which when pivoted together constitute the track belt of a track laying tractor; Fig. 2 is an end elevation of said link with certain parts thereof broken away in section; Fig. 3 is a longitudinal central vertical section of said track belt. Fig. 4 is an end view of the tread.

The link shown is so constructed that by pivoting a suitable number of them together the track belt of a track laying tractor will be formed. They are like the links heretofore used for that purpose in that each is preferably a casting having a shoe 10 and two longitudinally extended link sides or track bars 12, which are integal with the inner face of said shoe. The shoe projects on both sides of the link sides or track bars; and at both ends of the shoe the track bars project beyond the same. The distance between the inner surfaces of the track bars at one end of the shoe is substantially equal to the distance between the outer surfaces of the track bars at the other end of the shoe, so that the track bars at this end of one link may go between the track bars at the other end of the adjacent link, and be pivoted thereto.

In order that the present invention may be applied to the described links of a track belt, two downwardly projecting transversely extended grouser ribs 14 are formed integral with the shoe close to the ends thereof. A track belt made of links substantially as described having these grouser ribs is well adapted for traveling over soft earth or through sand or the like.

20 represents a vulcanized rubber tread block, which in its body portion is substantially semi-cylindrical in form. This tread block however, has an abruptly enlarged, substantially rectangular base 21 which is constructed to lie against the outer face of the shoe and between and in substantial contact with the two grouser ribs 14. 25 represents a clamping plate having through it a hole through which the body part of the tread block may pass, and in which it may substantially fit when said clamping plate rests upon the outer face of the projecting base of the tread block. This clamping plate likewise goes between the two grouser ribs 14 and is in substantial contact with them. Bolts 27 go through the shoe, the base 21 of the tread block, and through the clamping plate 25, and thereby the tread block is clamped in place against the outer face of the shoe. The clamping plate is, however, made of such width that its side edges may be and are turned at right angles to form the flanges 26 which overlap and substantially engage the side edges of the shoe.

It is evident that displacement of the tread block and clamping plate longitudinally with respect to the link is prevented by the grouser ribs 14, and that the relative displacement of the same parts laterally with respect to the link is prevented by the engagement with the sides of the shoe of the turned over ends of the clamping plate.

When, therefore, one wishes to employ a track laying tractor in service where it will be required to travel over soft earth or through sand or mud, the rubber tread blocks and the clamping plates will be omitted or removed.

When it is desired to use the machine on a hard smooth surface, and said track belt may be easily rendered more adaptable for this particular use by the application to the several links of the described rubber tread blocks.

Having described by invention, I claim:—

1. A link for the track belt of a track laying tractor having a shoe on the lower face of which are two transversely extended downwardly projecting ribs, combined with a tread block having a body portion and an abruptly enlarged base which fits the space between said ribs and engages said shoe, and a clamping plate having a central hole through which the body of the tread block passes, which clamping plate engages the base of said tread block, and clamping means connecting said clamping plate to the shoe and clamping the base of the tread block between them.

2. A link for the track belt of a track laying tractor comprising a shoe having transversely extended ribs projecting from its outer face, and longitudinally extended link sides integral with the inner face of said shoe, said link sides extending beyond both ends of the shoe and said shoe extending beyond both sides of the link sides and said ribs being located adjacent the front and rear ends of said shoe, combined with a tread block removably secured to the outer face of said shoe,—said tread block having a body portion and an abruptly enlarged base which fits the outer surface of the shoe between and in substantial contact with said ribs, a clamping plate having a central hole through which the body of the tread block passes,— which plate block engages the outer face of the enlarged base of the tread and substantially fits between said ribs, and clamping bolts going through the clamping plate, the base of the tread block and the shoe, to separably connect said three parts together.

3. A link for the track belt of a track laying tractor comprising a shoe having transversely extended ribs projecting from its outer face, and longitudinally extended link sides integral with the inner face of said shoe said link sides extending beyond both ends of the shoe and said shoe extending beyond both sides of the link sides and said ribs being located adjacent the front and rear ends of said shoe, combined with a tread block removably secured to said shoe,—said tread block having a body portion and an abruptly enlarged base which fits the outer surface of the shoe between and in substantial contact with said ribs, a clamping plate having a central hole through which the body of the tread block passes,— which plate engages the outer face of the enlarged base of the tread block and substantially fits between said ribs, said clamping plate having its sides bent over and extended past and into substantial engagement with the side edges of said shoe, and clamping bolts going through the clamping plate, the base of the tread block and the shoe to removably secure said three parts together.

In testimony whereof, I hereunto affix my signature.

ROLLIN H. WHITE.